June 20, 1950 — W. TRAUTNER — 2,512,397
ADJUSTABLE BRACKET
Filed Nov. 10, 1948
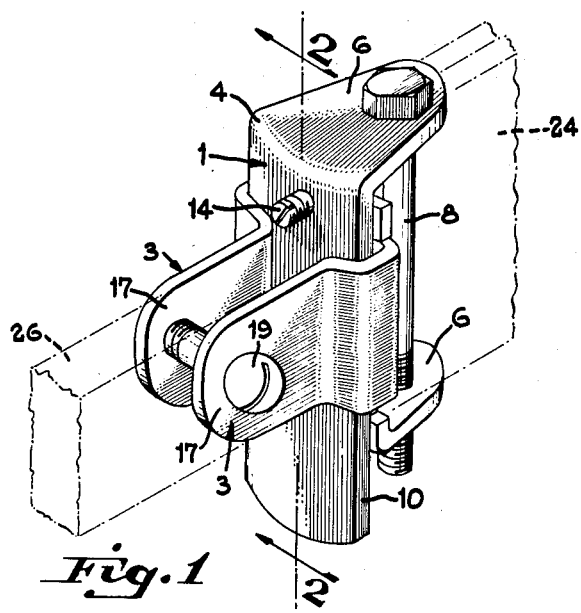
Fig. 1
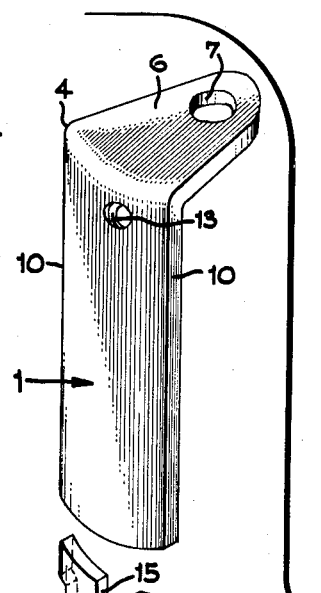
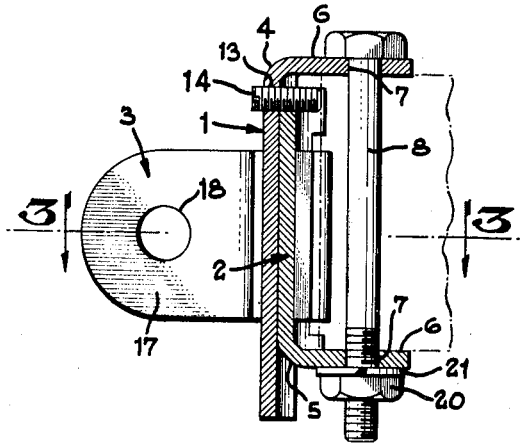
Fig. 2
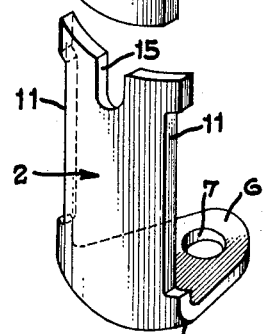
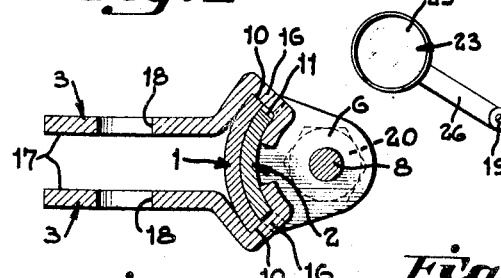
Fig. 3   Fig. 5
INVENTOR.
Wagn Trautner
BY
Wood, Arey, Herron & Evans
ATTORNEYS.

Patented June 20, 1950

2,512,397

UNITED STATES PATENT OFFICE 2,512,397

ADJUSTABLE BRACKET

Wagn Trautner, Syracuse, N. Y.

Application November 10, 1948, Serial No. 59,382

3 Claims. (Cl. 248—205)

This invention relates to brackets, and is directed particularly to an adjustable bracket for mounting rear vision mirrors or other accessories on the hinge of a vehicle door.

The bracket of this invention is designed primarily for use on commercial vehicles, such as trucks. However, it will be apparent that it may be utilized on any type of vehicle, preferably although not necessarily on the door hinge. Mounting posts and the attaching brackets of truck rear vision mirrors and the like are especially vulnerable to damage because these members must necessarily extend beyond the body line of the truck to provide a full degree of rear visibility. The bracket of this invention is particularly suited for mounting originally, or for remounting, as a replacement, accessories of this type. It is a particularly rugged bracket, can be attached and detached readily, and can be adjusted over a wide range to fit even the largest hinge.

With the present invention, it is not necessary to procure a mounting designed especially for the type of hinge on a particular vehicle door or to have one made especially by hand, as is so often the case when a replacement of a broken mounting is required. Accessories, such as rear vision mirrors and the like are not usually manufactured by the maker of the vehicle, but rather by specialties companies. These companies have had to adapt the mounting brackets of their accessories to a great number of sizes and styles of vehicle hinges varying from 1 to 3 or 4 inches in height. A number of universal mountings have been tried. However, these, at best, have been adaptable to hinges of only one or two sizes. Accordingly, it has been necessary for an accessory manufacturer to provide a number of these so-called universal brackets, each limited to adjustment in a small range.

It is the object of this invention to provide an improved universal bracket for mounting rear vision mirrors and the like which is adjustable and can be fitted to vehicle door hinges of substantially all sizes and designs, and which incorporates improved clamping means for securing the accessory to the bracket.

In the preferred embodiment of the invention, the body portion of the adjustable bracket is comprised of two slidably engaged vertical plate members which have projections bent over at the respective upper and lower ends, at right angles, for embracing the respective upper and lower ends of a vehicle door hinge. The bracket is secured to the hinge by means of a bolt or pin which is installed in the hinge in place of the usual hinge pin and which extends through holes which are drilled in axial alignment through the two projections. The post of a rear vision mirror, turn indicator or other accessory is attached to the body portion of the bracket by means of a pair of parallel arms extending outwardly from the bracket. These arms are attached to the body portion of the bracket by means of a novel clamping arrangement, whereby a single bolt serves the double function of clamping the post of the accessory between the arms and also exerts a clamping pressure which secures the arms to the body of the bracket.

A typical bracket, constructed in accordance with the present invention is shown in the drawings in which:

Figure 1 is a perspective view of the mounting bracket of my invention.

Figure 2 is a cross-sectional view taken on line 2—2, Figure 1.

Figure 3 is a cross-sectional view taken on line 3—3, Figure 2.

Figure 4 is an exploded view showing the elements of the bracket.

Figure 5 is an elevational view showing a rear vision mirror mounted in the bracket of this invention.

Referring to the drawings, the body portion of the mounting bracket includes a pair of vertically disposed plate members, indicated generally at 1 and 2, and a pair of clamping elements, indicated generally at 3. In the embodiment shown in the drawings, the two plate members are arcuate in cross-section and adapted to engage in nested relationship, as shown in Figure 3. This construction improves the appearance and strength of the bracket and tends to facilitate the positioning of the bracket on the hinge. The respective upper and lower ends of the two plate members are bent over, as at 4 and 5, to provide substantially right angular projections 6—6. Bores 7—7 are provided in the projections and when the two vertical members are in nested relationship these bores are aligned axially. These bores receive a bolt or pin 8, which is installed in the hinge in place of the usual pin; the hinge pin being knocked out before mounting the bracket.

Plate member 1 is disposed to the outside of plate member 2, and it will be noted that the lateral edges, 10—10 of this member are continuous. On the other hand, the inner plate 2 has its lateral edges notched out as at 11—11, so that when the two plates 1 and 2 are engaged, the lateral edges of plate 2 are recessed with respect to the lateral edges of the plate 1.

A threaded bore 13 is provided in the face of the plate 1, near the turned over projection 6. A set screw 14 is threaded therethrough and engages against the hinge on which the bracket is mounted. The upper edge of the inner plate 2 is notched out as at 15 to provide clearance for the set screw 14. Accordingly, the thrust of the set screw 14, when tightened, is transmitted to the outer vertical member 1 only.

Each of the pairs of clamping elements 3 is configurated to include a vertical channel portion 16, and an extended arm portion 17. The width of each channel portion 16 is such that when engaged around the lateral edges of the two plates 1 and 2, these plates are held in a sliding fit (see Figure 3). The arms 17 extend laterally at right angles outwardly from the two plates in substantial parallelism. Bores 18—18 are provided through these parallel arms for the reception of a bolt 19, as shown in Figure 1. One of the holes 18 may be threaded, or a nut and lock washer provided (not shown).

It will be noted that the bolt 19 serves a double function. In the first place, it acts as the means for securing the post of a rear vision mirror, or other accessory to the bracket. Secondly, it serves as a means for securing the arms to the plate members. Thus, on tightening bolt 19, the arms are drawn toward each other effecting clamping pressure on the accessory post and also on the lateral edges of the wider of the two plate members. In the embodiment shown in the drawings, the two parallel arms are plain. However, it will be apparent that these arms may be configurated in various ways to be more readily adaptable for mounting accessories, for instance, by the addition of surface serrations, detents or other means well known to the art.

Figure 5 shows a rear vision mirror, indicated generally at 23, mounted on a hinge 24 by means of the bracket of the present invention. The mirror includes a head 25 and a post 26. The post 26 includes a bore (not shown) for cooperation with bolt 19 for clamping the post to the bracket. The position of the mirror may be adjusted relative to the hinge by loosening bolt 19 for swinging in the vertical plane or by loosening set screw 14 for swinging in the horizontal plane.

In installing the mounting bracket, the hinge pin is first driven out of the hinge on which it is desired to mount the bracket. The two plates are placed in a nested relationship, and the clamping elements engaged over the lateral edges of both plate members. The post of the accessory is engaged between the parallel arms 17 of the clamp, and the bolt 19 slipped in place and tightened. Upon tightening of the bolt 19, the web portions of the channels at the inner ends of the clamps grip the lateral edges of the outer vertical member. Even though the post of the accessory is clamped tightly, the inner vertical member 2 is free to be slid to adjust the distance between the two projections 6—6 to fit the size hinge upon which the bracket is to be mounted. Bolt 8 is then slipped through the bores 7—7 of the hinge, and a nut 20, threaded on the lower end of the bolt. A lock washer as shown at 21 may be employed. The set screw 14 is then tightened against the hinge. It will be noted in Figure 2 that when the set screw 14 is tightened, the thrust is carried directly to the outer plate, which tends to spring it out of line, effecting clamping engagement between the two plate members in the channel portions 16.

It frequently happens that after a vehicle door has been used for a considerable length of time the hinges get out of line slightly and rigid bracket means of the type provided in the past for mounting mirrors cannot be fitted over one of the hinges unless it is realigned exactly. One desirable feature of the present invention lies in the yieldability of the lower or inner plate member. Since the channels of the clamp elements do not engage the lateral edges of the lower plate member, it is possible to spring this member out of line slightly to conform to the misalignments of old hinges.

The present disclosure of the bracket has been directed toward mounting the bracket on the hinge of a vehicle door. However, it will be readily apparent that by slightly modifying the configuration of the projections 6—6, the bracket can be mounted in other places. The particular relative sizes of the two plate members comprising the body of the bracket shown in the drawings are not critical. It will be readily apparent that the outer plate member may be two or three times the length that is shown in Figure 4 of the drawings without departing from the invention.

Having described my invention, I claim:

1. An adjustable bracket for mounting accessories on a hinge of a vehicle door comprising; a pair of vertically disposed plate members, one of said plate members being wider than the other, said plate members being configurated to nest one within the other, the wider plate member having a projection extending substantially at right angles from the upper end thereof, the other plate member having a similar projection extending from the lower end thereof, means for securing said projections to said hinge, a pair of arms extending outwardly from said plate members, said arms including vertical channel portions at the inner ends thereof, said channel portions being adapted for embracing the lateral edges of both plate members, and means for exerting clamping pressure on said arms whereby the wider plate member is clamped between the respective channel portions of the arms and whereby the other plate member is held in sliding engagement with the wider plate member.

2. An adjustable bracket for mounting accessories on a hinge of a vehicle door comprising; a pair of vertically disposed plate members, one of said plate members being wider than the other, said plate members being configurated to nest one within the other, means for securing said plate members to said hinge, a pair of arms extending outwardly from said plate members, said arms including vertical channel portions at the inner ends thereof, said channel portions being adapted for embracing the lateral edges of both plate members, and means for exerting clamping pressure on said arms whereby the wider plate member is clamped between the respective channel portions of the arms and whereby the other plate member is held in sliding engagement with the wider plate member.

3. A bracket comprising; a pair of vertical plate members of arcuate configuration transversely, said plates being disposed in sliding engagement, one of said vertical members being wider than the other, a pair of arms extending outwardly from said plate members, said arms including vertical channel portions at the inner ends thereof, said channel portions being adapted for embracing the lateral edges of said vertical plate members, and means for clamping the said channel members to the lateral edges of one of said plate members.

WAGN TRAUTNER.

REFERENCES CITED

The following references are of record in the file of this patent:

UNITED STATES PATENTS

| Number | Name | Date |
|---|---|---|
| 1,227,258 | Godley | May 22, 1917 |
| 1,430,135 | Williams | Sept. 26, 1922 |
| 2,134,016 | Zink | Oct. 25, 1938 |
| 2,176,723 | Sauer | Oct. 17, 1939 |
| 2,237,282 | Reed | Apr. 1, 1941 |
| 2,341,048 | Kopp | Feb. 8, 1944 |